United States Patent
Tasman et al.

(10) Patent No.: US 8,103,792 B2
(45) Date of Patent: Jan. 24, 2012

(54) SYSTEMS AND METHODS FOR FORWARDING DATA UNITS IN A COMMUNICATIONS NETWORK

(75) Inventors: Mitchell P. Tasman, Boston, MA (US); Jason Keith Redi, Belmont, MA (US); Richard Dennis Rockwell, Concord, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 0 days.

(21) Appl. No.: 12/576,170

(22) Filed: Oct. 8, 2009

(65) Prior Publication Data
US 2010/0040062 A1 Feb. 18, 2010

Related U.S. Application Data

(63) Continuation of application No. 10/649,030, filed on Aug. 27, 2003, now Pat. No. 7,606,927.

(51) Int. Cl.
G06F 15/173 (2006.01)
G06F 11/00 (2006.01)

(52) U.S. Cl. ........ 709/238; 370/253; 370/229; 370/412; 707/799; 709/239

(58) Field of Classification Search .......... 709/238–239; 707/799; 370/229, 253, 412
See application file for complete search history.

(56) References Cited

U.S. PATENT DOCUMENTS

| | | |
|---|---|---|
| 4,718,002 A | 1/1988 | Carr |
| 4,827,411 A | 5/1989 | Arrowood et al. |
| 5,079,767 A | 1/1992 | Perlman |
| 5,093,824 A | 3/1992 | Coan et al. |
| 5,117,422 A | 5/1992 | Hauptschein et al. |
| 5,175,843 A | 12/1992 | Casavant et al. |
| 5,243,592 A | 9/1993 | Perlman et al. |
| 5,412,654 A | 5/1995 | Perkins |
| 5,430,729 A | 7/1995 | Rahnema |
| 5,541,912 A | 7/1996 | Choudhury et al. |
| 5,649,119 A | 7/1997 | Kondoh et al. |
| 5,742,820 A | 4/1998 | Perlman et al. |
| 5,764,895 A | 6/1998 | Chung |
| 5,828,835 A | 10/1998 | Isfeld et al. |
| 5,850,592 A | 12/1998 | Ramanathan |
| 5,878,056 A * | 3/1999 | Black et al. .................. 714/748 |

(Continued)

FOREIGN PATENT DOCUMENTS

EP 0 447725 9/1991

(Continued)

OTHER PUBLICATIONS

Office Action dated Oct. 27, 2009, U.S. Appl. No. 10/786,335.

(Continued)

Primary Examiner — Alina N. Boutah
(74) Attorney, Agent, or Firm — Ropes & Gray LLP

(57) ABSTRACT

A network device (110) includes a forwarding module (230) and one or more network interfaces (240) that may be configured to transmit data units. The forwarding module (230) may be configured to identify one of the network interfaces (240) to transmit a data unit when the data unit is received by the network device (110) or generated by the network device (110), determine one of the network interfaces (240) to transmit the data unit when the data unit is ready to be transmitted by the network device (110), and forward the data unit to the determined network interface (240) for network when the determined network interface (240) is the identified network interface (240).

30 Claims, 11 Drawing Sheets

U.S. PATENT DOCUMENTS

| | | | |
|---|---|---|---|
| 5,878,095 | A | 3/1999 | Kainulainen et al. |
| 5,881,246 | A | 3/1999 | Crawley et al. |
| 5,884,040 | A | 3/1999 | Chung |
| 5,903,735 | A * | 5/1999 | Kidder et al. ................. 709/240 |
| 5,913,921 | A | 6/1999 | Tosey et al. |
| 5,959,989 | A | 9/1999 | Gleeson et al. |
| 5,960,047 | A | 9/1999 | Proctor, Jr. et al. |
| 5,974,327 | A | 10/1999 | Agrawal et al. |
| 6,000,011 | A | 12/1999 | Freerksen et al. |
| 6,028,857 | A | 2/2000 | Poor |
| 6,032,190 | A | 2/2000 | Bremer et al. |
| 6,046,978 | A | 4/2000 | Melnik |
| 6,067,301 | A | 5/2000 | Aatresh |
| 6,069,895 | A | 5/2000 | Ayandeh et al. |
| 6,088,622 | A | 7/2000 | Dollin et al. |
| 6,088,734 | A | 7/2000 | Marin et al. |
| 6,092,096 | A | 7/2000 | Lewis et al. |
| 6,094,435 | A | 7/2000 | Hoffman et al. |
| 6,122,753 | A | 9/2000 | Masuo et al. |
| 6,139,199 | A | 10/2000 | Rodriguez |
| 6,151,308 | A | 11/2000 | Ibanez-Meier et al. |
| 6,173,324 | B1 | 1/2001 | D'Souza |
| 6,215,765 | B1 | 4/2001 | McAllister et al. |
| 6,216,167 | B1 | 4/2001 | Momirov |
| 6,252,856 | B1 | 6/2001 | Zhang |
| 6,262,976 | B1 | 7/2001 | McNamara |
| 6,272,567 | B1 | 8/2001 | Pal et al. |
| 6,275,492 | B1 | 8/2001 | Zhang |
| 6,304,548 | B1 | 10/2001 | Shaffer et al. |
| 6,304,556 | B1 | 10/2001 | Haas |
| 6,310,883 | B1 | 10/2001 | Mann et al. |
| 6,330,459 | B1 | 12/2001 | Crichton et al. |
| 6,349,091 | B1 | 2/2002 | Li |
| 6,362,821 | B1 | 3/2002 | Gibson et al. |
| 6,385,174 | B1 | 5/2002 | Li |
| 6,385,673 | B1 | 5/2002 | DeMoney |
| 6,396,814 | B1 | 5/2002 | Iwamura et al. |
| 6,418,299 | B1 | 7/2002 | Ramanathan |
| 6,456,599 | B1 | 9/2002 | Elliott |
| 6,470,329 | B1 | 10/2002 | Livschitz |
| 6,473,421 | B1 | 10/2002 | Tappan |
| 6,473,434 | B1 * | 10/2002 | Araya et al. ................. 370/412 |
| 6,496,510 | B1 | 12/2002 | Tsukakoshi et al. |
| 6,542,469 | B1 | 4/2003 | Kelley et al. |
| 6,570,867 | B1 * | 5/2003 | Robinson et al. ............. 370/351 |
| 6,574,227 | B1 | 6/2003 | Rosenberg et al. |
| 6,594,268 | B1 | 7/2003 | Aukia et al. |
| 6,611,522 | B1 * | 8/2003 | Zheng et al. ............. 370/395.21 |
| 6,628,929 | B1 | 9/2003 | Nomura et al. |
| 6,631,136 | B1 | 10/2003 | Chowdhury et al. |
| 6,633,544 | B1 | 10/2003 | Rexford et al. |
| 6,671,819 | B1 | 12/2003 | Passman et al. |
| 6,683,885 | B1 | 1/2004 | Sugai et al. |
| 6,687,781 | B2 | 2/2004 | Wynne et al. |
| 6,714,563 | B1 | 3/2004 | Kushi |
| 6,721,273 | B1 | 4/2004 | Lyon |
| 6,745,224 | B1 | 6/2004 | D'Souza et al. |
| 6,769,043 | B1 | 7/2004 | Fedorkow et al. |
| 6,804,236 | B1 | 10/2004 | Mahajan et al. |
| 6,807,158 | B2 | 10/2004 | Krishnamurthy et al. |
| 6,807,172 | B1 | 10/2004 | Levenson et al. |
| 6,817,018 | B1 * | 11/2004 | Clarke et al. ................. 719/313 |
| 6,829,222 | B2 | 12/2004 | Amis et al. |
| 6,831,587 | B1 * | 12/2004 | Joshi ............................. 341/160 |
| 6,870,846 | B2 | 3/2005 | Cain |
| 6,954,449 | B2 | 10/2005 | Cain et al. |
| RE38,902 | E | 11/2005 | Srisuresh et al. |
| 6,968,447 | B1 * | 11/2005 | Apisdorf et al. ............... 712/235 |
| 6,977,895 | B1 | 12/2005 | Shi et al. |
| 6,977,937 | B1 | 12/2005 | Weinstein et al. |
| 6,980,515 | B1 | 12/2005 | Schunk et al. |
| 6,980,537 | B1 | 12/2005 | Liu |
| 6,985,483 | B2 * | 1/2006 | Mehrotra et al. ............. 370/389 |
| 6,990,350 | B2 | 1/2006 | Davis et al. |
| 7,020,501 | B1 | 3/2006 | Elliott et al. |
| 7,020,701 | B1 | 3/2006 | Gelvin et al. |
| 7,039,720 | B2 | 5/2006 | Alfieri et al. |
| 7,042,834 | B1 | 5/2006 | Savage |
| 7,042,837 | B1 | 5/2006 | Cassiday et al. |
| 7,046,628 | B2 | 5/2006 | Luhmann et al. |
| 7,065,059 | B1 | 6/2006 | Zinin |
| 7,068,971 | B2 | 6/2006 | Abutaleb et al. |
| 7,072,952 | B2 | 7/2006 | Takehiro et al. |
| 7,103,344 | B2 | 9/2006 | Menard |
| 7,106,703 | B1 | 9/2006 | Belcea |
| 7,116,640 | B2 * | 10/2006 | Tasman et al. ................. 370/252 |
| 7,120,120 | B2 | 10/2006 | Guerin et al. |
| 7,177,295 | B1 | 2/2007 | Sholander et al. |
| 7,184,421 | B1 | 2/2007 | Liu et al. |
| 7,200,120 | B1 | 4/2007 | Greenberg et al. |
| 7,215,639 | B2 * | 5/2007 | De Maria et al. ............. 370/235 |
| 7,215,926 | B2 | 5/2007 | Corbett et al. |
| 7,254,111 | B2 | 8/2007 | Choe et al. |
| 7,266,386 | B2 | 9/2007 | Kim et al. |
| 7,281,057 | B2 | 10/2007 | Cain |
| 7,289,456 | B2 | 10/2007 | Gupta et al. |
| 7,289,517 | B1 * | 10/2007 | Shimonishi ............... 370/395.52 |
| 7,321,580 | B1 * | 1/2008 | Ramanathan et al. ........ 370/339 |
| 7,349,343 | B2 * | 3/2008 | Shipman ....................... 370/236 |
| 7,353,259 | B1 | 4/2008 | Bakke et al. |
| 7,369,512 | B1 | 5/2008 | Shurbanov et al. |
| 7,406,034 | B1 * | 7/2008 | Cometto et al. ............... 370/218 |
| 7,877,504 | B2 * | 1/2011 | Vipat ............................. 709/238 |
| 2001/0007560 | A1 | 7/2001 | Masuda et al. |
| 2001/0034793 | A1 | 10/2001 | Madruga et al. |
| 2001/0040895 | A1 | 11/2001 | Templin |
| 2001/0045914 | A1 | 11/2001 | Bunker |
| 2002/0016869 | A1 | 2/2002 | Comeau et al. |
| 2002/0029214 | A1 | 3/2002 | Yianilos et al. |
| 2002/0057660 | A1 | 5/2002 | Park et al. |
| 2002/0067693 | A1 | 6/2002 | Kodialam et al. |
| 2002/0071392 | A1 | 6/2002 | Grover et al. |
| 2002/0075813 | A1 * | 6/2002 | Baldonado et al. ........... 370/254 |
| 2002/0078196 | A1 * | 6/2002 | Kim et al. ...................... 709/224 |
| 2002/0080755 | A1 | 6/2002 | Tasman et al. |
| 2002/0103893 | A1 | 8/2002 | Frelechoux et al. |
| 2002/0108107 | A1 | 8/2002 | Darnell et al. |
| 2002/0131409 | A1 | 9/2002 | Frank et al. |
| 2002/0143755 | A1 | 10/2002 | Wynblatt et al. |
| 2002/0176390 | A1 | 11/2002 | Sparr et al. |
| 2002/0186694 | A1 | 12/2002 | Mahajan et al. |
| 2002/0191545 | A1 | 12/2002 | Pieda et al. |
| 2003/0012168 | A1 | 1/2003 | Elson et al. |
| 2003/0016624 | A1 | 1/2003 | Bare |
| 2003/0043742 | A1 * | 3/2003 | De Maria et al. ............. 370/230 |
| 2003/0048771 | A1 * | 3/2003 | Shipman ....................... 370/351 |
| 2003/0058852 | A1 | 3/2003 | Luhmann et al. |
| 2003/0063609 | A1 * | 4/2003 | Bergenfeld ................... 370/390 |
| 2003/0063613 | A1 | 4/2003 | Carpini et al. |
| 2003/0093576 | A1 * | 5/2003 | Dettinger et al. ............. 709/313 |
| 2003/0096577 | A1 | 5/2003 | Heinonen et al. |
| 2003/0124976 | A1 | 7/2003 | Tamaki et al. |
| 2003/0126284 | A1 | 7/2003 | Houston et al. |
| 2003/0152182 | A1 * | 8/2003 | Pai et al. ....................... 375/372 |
| 2003/0153338 | A1 | 8/2003 | Herz et al. |
| 2003/0174654 | A1 * | 9/2003 | Tateson et al. ................ 370/238 |
| 2003/0174719 | A1 | 9/2003 | Sampath et al. |
| 2003/0179751 | A1 * | 9/2003 | Omae et al. ................... 370/392 |
| 2003/0202476 | A1 | 10/2003 | Billhartz et al. |
| 2004/0001720 | A1 | 1/2004 | Krill et al. |
| 2004/0003111 | A1 | 1/2004 | Maeda et al. |
| 2004/0027284 | A1 | 2/2004 | Leeper et al. |
| 2004/0029553 | A1 | 2/2004 | Cain |
| 2004/0032856 | A1 * | 2/2004 | Sandstrom .................... 370/351 |
| 2004/0106408 | A1 | 6/2004 | Beasley et al. |
| 2004/0131079 | A1 * | 7/2004 | Hegde et al. .................. 370/466 |
| 2004/0202164 | A1 | 10/2004 | Hooper et al. |
| 2004/0213167 | A1 | 10/2004 | Garcia-Luna-Aceves et al. |
| 2004/0243702 | A1 | 12/2004 | Vainio et al. |
| 2005/0013613 | A1 | 1/2005 | Stevenson et al. |
| 2005/0018665 | A1 * | 1/2005 | Jordan et al. ................. 370/388 |
| 2005/0030949 | A1 | 2/2005 | Shirakawa et al. |
| 2005/0036442 | A1 | 2/2005 | Saleh et al. |
| 2005/0036445 | A1 * | 2/2005 | Chien-Hsin ................... 370/229 |
| 2005/0050221 | A1 | 3/2005 | Tasman et al. |
| 2005/0117914 | A1 | 6/2005 | Chuah et al. |
| 2005/0213586 | A1 | 9/2005 | Cyganski et al. |

| | | |
|---|---|---|
| 2007/0106852 A1 | 5/2007 | Lam et al. |
| 2007/0113003 A1* | 5/2007 | Joshi .......................... 711/108 |
| 2007/0168778 A1* | 7/2007 | Kaginele .................... 714/718 |

FOREIGN PATENT DOCUMENTS

WO    WO-01/37483    5/2001

OTHER PUBLICATIONS

Office Action dated Nov. 2, 2009, U.S. Appl. No. 10/752,988.
Office Action dated Nov. 24, 2009, U.S. Appl. No. 10/913,151.
Office Action dated Apr. 21, 2010, U.S. Appl. No. 10/752,988.
Basu et al., "Movement Control Algorithms for Realization of Fault-Tolerant Ad Hoc Robot Networks," IEEE Network, pp. 36-44, Jul./Aug. 2004.
Bevan et al., "Free-Space Optical Data Bus for Spacecraft", Earth Science Technology Conference, Jun. 24-26, 2003, 6 pages.
Choudhury et al., "Using Directional Antennas for Medium Access Control in Ad Hoc Networks", MOBICOM' 002, Sep. 23-28, 2002, pp. 59-70.
Everett, "GPM Reference Interfaces", May 30, 2001, 9 pages.
Garcia Lune Aceves et al., "Analysis of Routing Strategies for Packet Radio Networks", Proc. of the IEEE INFOCOM '85, Washington, DC, 292-302 (185).
Garg, et al, "Improved Approximation Algorithms for Biconnected Subgraphs via Better Lower Bounding Techniques," Department of Computer Science and Engineering, Indian Institute of Technology, New Delhi, pp. 103-111 (1993).
Hahn et al., "Packet Radio Network Routing Algorithms: A Survey," IEEE Communications Magazine. 22:11, 41-7 (Nov. 1984).
Hsu et al., "Simpler and Faster Biconnectivity Augmentation," Journal of Algorithms, 45:55-71 (2002).
Jacquet et al. "Optimized Link State Routing Protocol for Ad Hoc Networks", Proc. IEEE INMIC, Pakistan, pp. 1.
Jennings et al., "Topology Control for Efficient Information Dissemination in Ad-hoc Networks," Jet Propulsion Laboratory, pp. 1-7. (2002).
Jubin et al., "The DARPA Packet Radio Network Protocols," Proc. of the IEEE, 75:1, 21-32 (Jan. 1987).
Kahn, "The Organization of Computer Resources into a Packet Radio Network," IEEE Trans. on Communications. COM-25:1, 169-78 (Jan. 1977).
Karp, B. et al. GPSR: Greedy Perimeter Stateless Routing for Wireless Networks. ACM/IEEE International Conference on Mobile Computing and Networking (MobiCom 2000).
Khuller et al., "Biconnectivity Approximations and Graph Carvings," Journal of the ACM, 41(2):214-235 (1994).
Lauer, Gregory S., "Packet Radio Routing," Ch. 11, "Routing in Communications Networks," ed. Martha Steenstrup, Prentice Hall, pp. 352-396 (1995).
Lee, S. et al. "Neighbor Supporting Ad Hoc Multicast Routing Protocol" Seoul National Univeristy, 8 pages.
Lee, Sung-Ju et al. A Performance Comparison Study of Ad Hoc Wireless Multicast Protocols, University of California, 10 pages.
Li et al., "Sending Messages to Mobile Users in Disconnected Ad-Hoc Wireless Networks," MOBICOM (2000).
Liao et al., "GRID: A Fully Location-Aware Routing Protocol for Mobile Ad Hoc Networks," Telecommunications Systems, 18(1):37-60 (2001).
Lin et al., "Adaptive Clustering for Mobile Wireless Networks," IEEE Journal on Selected Areas in communications, 15(7):1-21 (1997).
Magness, Rodger, "A Comparison of CAN and Bluetooth Protocols—A Study for Application of CAN over Bluetooth for Wireless Onboard Data Handling for a Spacecraft Sensor Network", NASA Astrophysics Data System, 24 pages.
McAuley et al., "Self-Configuring Networks," MOBICOM pp. 315-319 (2000).
McKeown, "A Quick Tutorial on IP Router Design", Optics and Routing Seminar, Oct. 10, 2000.
Mount, "Articulation Points and Biconnected Components," CMSC 451: Lecture 11, Tuesday, Oct. 6, 1998. www.cs.umd.edu/~samir/451/bc.ps. pp. 1-5.
Moy, "Link-State Routing," Ch. 5, "Routing in Communications Networks," ed. Martha Steenstrup, Prentice Hall, pp. 136-157 (1995).
Office Action dated Mar. 3, 2009, U.S. Appl. No. 10/752,988.
Office Action dated Apr. 18, 2008, U.S. Appl. No. 11/088,045.
Office Action dated Jun. 11, 2008, U.S. Appl. No. 10/786,335.
Office Action dated Jun. 26, 2008, U.S. Appl. No. 10/913,151.
Office Action dated Nov. 2, 2007, U.S. Appl. No. 10/786,335.
Office Action dated Nov. 16, 2007, U.S. Appl. No. 10/649,030.
Office Action dated Dec. 13, 2007, U.S. Appl. No. 10/328,566.
Office Action dated Feb. 24, 2009, U.S. Appl. No. 10/786,335.
Office Action dated Feb. 25, 2009, U.S. Appl. No. 10/649,030.
Office Action dated Jan. 22, 2009, U.S. Appl. No. 10/694,968.
Office Action dated May 1, 2009, U.S. Appl. No. 10/913,151.
Office Action dated May 16, 2007, U.S. Appl. No. 10/702,308.
Office Action dated May 17, 2007, U.S. Appl. No. 10/649,030.
Office Action dated Oct. 10, 2006, U.S. Appl. No. 10/649,030.
Office Action dated Oct. 11, 2005, U.S. Appl. No. 10/649,030.
Office Action dated Oct. 3, 2007, U.S. Appl. No. 10/702,308.
Pascall et al., "Commercial Satellite Communication", 1997 pp. 78-91.
Prague, "Power Line Carrier Techniques Applied to Spacecraft Data Handling, Data Systems in Areospace DASIA", Jun. 2-6, 2003, Czech Republic, 16 pages.
Ramanathan et al., "Topology Control of Multihop Wireless Networks using Transmit Power Adjustment," Proc. IEEE INFOCOM 2000, Mar. 2000, 10 pages.
SEA (Group) Ltd., "Terra SAR Equipment Development", 2003 1 page.
Waligore, "Test and Training Technology Workshop" Applied Research Laboratories, Feb. 15, 2002, 27 pages.
Winfield, Alan, "Distributed Sensing and Data Collection Via Broken Ad Hoc Wireless Connected Networks of Mobile Robots," Springer, pp. 273-282, (2000).

* cited by examiner

SYSTEMS AND METHODS FOR FORWARDING DATA UNITS IN A COMMUNICATIONS NETWORK

CROSS-REFERENCE TO RELATED APPLICATION

This is a continuation of and claims priority to U.S. patent application Ser. No. 10/649,030, filed on Aug. 27, 2003, which is hereby incorporated herein by reference in its entirety.

GOVERNMENT CONTRACT

The U.S. Government has a paid-up license in this invention and the right in limited circumstances to require the patent owner to license others on reasonable terms as provided for by the terms of Contract No. DAAD19-01-C-0027 awarded by the Department of the Army.

FIELD OF THE INVENTION

The present invention relates generally to communications networks and, more particularly, to systems and methods for forwarding data units in a communications network.

BACKGROUND OF THE INVENTION

Multi-hop networks are useful in many situations where network infrastructure either does not exist or cannot be trusted. Examples include military operations, disaster relief, and temporary offices. Multi-hop networks (also called packet radio networks, ad hoc networks, or mesh networks) typically use radio frequency (RF) transceivers to send and receive data. In a multi-hop network, nodes in the network typically include a "forwarding" module that performs the functions of:

1. Accepting packets from the lower layer radio, the upper layer Internet Protocol (IP) protocols, or the network control protocols.
2. Using the final destination(s) and type of service (ToS) bits in the packet to determine the appropriate next hop(s) in the network.
3. Determining the type of service requirements in terms of radio transmission characteristics and queuing discipline.
4. Passing the packet to the correct interface or interfaces for radio transport or dropping the packet.

In most multi-hop radio systems, this forwarding operation, which is also referred to as a switching operation, is typically faster than the radio transmission to the next-hop(s), so queues need to exist inside a node for holding packets that are waiting to be sent. In a highly mobile multi-hop network, it is not uncommon for the next-hop of a packet to change between the time the packet is initially received and processed and the time the interface is ready for transmitting it to a next-hop. In a system that has long queues between the forwarding next-hop lookup and the transmission of the packet by radio, situations can exist where packets at the head of the queue (next in line for transmission by the radio) have been designated for transmission to next-hops that are no longer reachable by the radio. This causes many re-transmissions to occur since the radio layer does not know that the next-hop is now unreachable. These re-transmissions can further delay other packets already in queue so that their next-hops may now also be unreachable by the time these packets reach the head of the queue.

Therefore, there exists a need for systems and methods that improve routing of data in mobile, multi-hop networks.

SUMMARY OF THE INVENTION

Systems and methods consistent with the principles of the invention provide improved techniques for routing data in communications networks.

In one implementation consistent with the principles of the invention, a network device that includes one or more queues, one or more network interfaces, and a forwarding module is provided. Each queue is configured to store one or more data units. Each of the network interfaces is associated with at least one queue of the one or more queues and is configured to forward the one or more data units to other network devices. The forwarding module is configured to receive a first data unit, identify one of the network interfaces for transmitting the first data unit, and store the first data unit in a queue of the at least one queue associated with the identified network interface. The forwarding module is further configured to retrieve the first data unit from the queue associated with the identified network interface, determine one of the network interfaces for transmitting the first data unit, and forward the first data unit to the determined network interface when the determined network interface corresponds to the identified network interface.

In another implementation consistent with the principles of the invention, a method for transmitting data units from a node that includes one or more network interfaces is provided. The method includes identifying a first one of the network interfaces to transmit a data unit when the data unit is received by the node or generated by the node; determining a second one of the network interfaces to transmit the data unit when the data unit is ready to be transmitted by the node; and transmitting the data unit via the second network interface when the second network interface is the same as the first network interface.

In yet another implementation consistent with the principles of the invention, a method for storing data units in a node that includes a group of queues is provided. Each queue is associated with a priority and one or more buffers. The method includes determining whether a data unit is locally generated, where the data unit is associated with a priority; determining, when the data unit has been locally generated, whether a number of buffers in use for data units of equal or higher priority exceeds a threshold; dropping the data unit when the number of buffers in use exceeds the threshold; determining, when the data unit is not locally generated or the number of buffers in use does not exceed the threshold, if a free buffer exists; storing, when a free buffer exists, the packet in the free buffer; selecting a non-empty, lower priority queue from the plurality of queues when no free buffer exists; emptying a buffer from the selected lower priority queue; and storing the data unit in the emptied buffer.

In still another implementation consistent with the principles of the invention, a method for processing a multicast data unit in a node that includes one or more network interfaces is provided. Each of the network interfaces is associated with at least one queue. The method includes storing the multicast data unit in a memory, storing a virtual placeholder in a queue of the at least one queue associated with at least one of the one or more network interfaces, identifying, when one of the virtual placeholders reaches a head of one of the at least one queue, neighboring nodes to receive the multicast data unit, identifying, for each identified neighboring node, one network interface of the one or more network interfaces, and placing a copy of the multicast data unit at a head of a queue of the at least one queue associated with each of the identified one network interfaces.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention may provide just-in-time forwarding decisions to ensure that data being transmitted by a node in a communications network reaches its intended destination.

While the foregoing description focuses on a multi-hop, wireless network, implementations consistent with the principles of the invention are equally applicable to wired networks, optical networks, and hybrid networks including a combination of wired, wireless, and/or optical technologies.

Exemplary System

Figure 1:
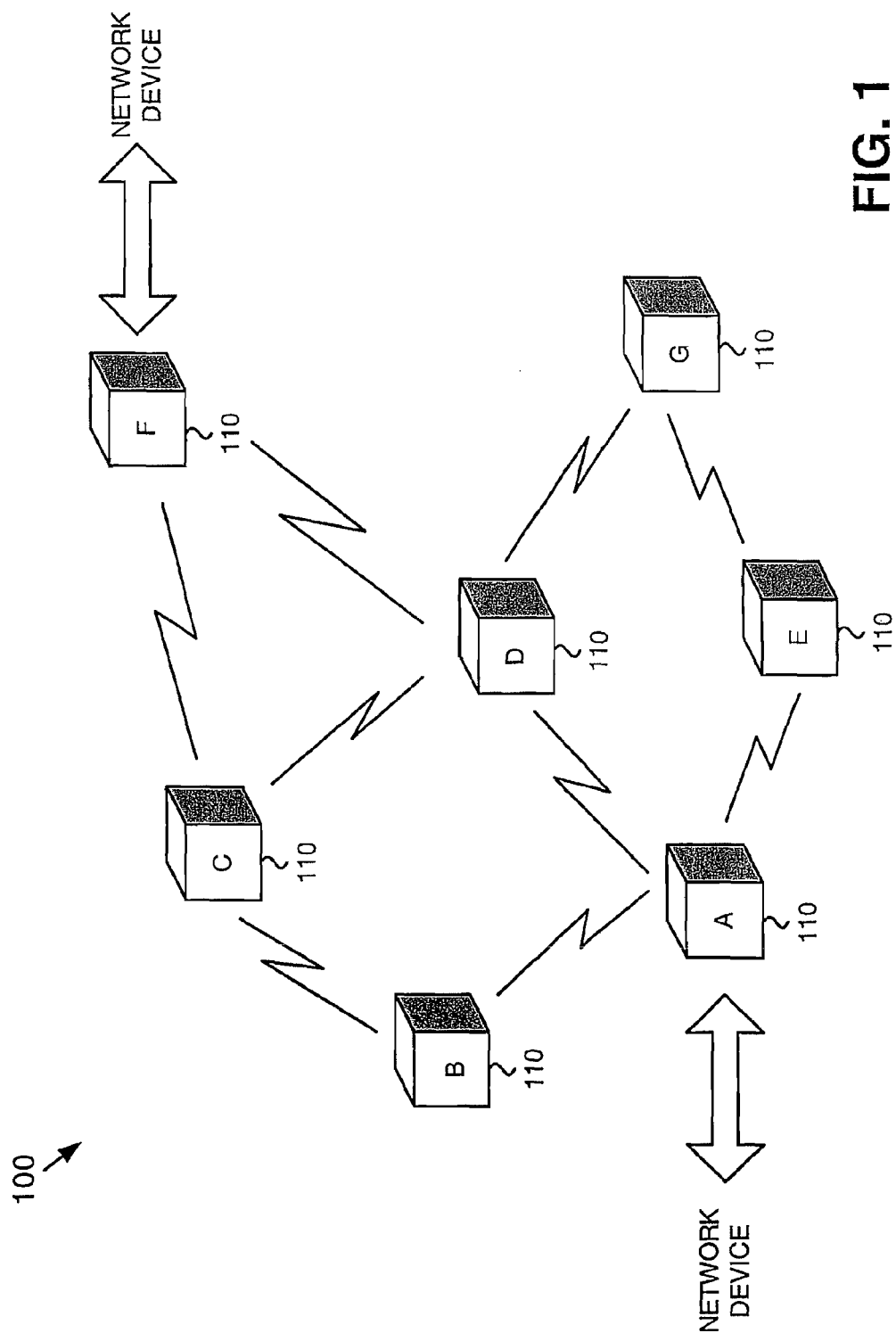
FIG. 1 illustrates an exemplary network in which systems and methods consistent with the principles of the invention may be implemented.

FIG. 1 illustrates an exemplary network 100 in which systems and methods consistent with the principles of the invention may be implemented. Network 100 may include mobile nodes 110 that may route data between network devices or networks. Seven nodes 110 have been shown for simplicity. A typical network may include more or fewer nodes than illustrated in FIG. 1.

The network devices may include devices, such as mainframes, minicomputers, personal computers, laptops, personal digital assistants, or the like, capable of transmitting data via nodes 110. Network devices may also include routing and/or switching devices. Network devices may connect to nodes 110, such as nodes A and F 110, via wired, wireless, and/or optical connections.

Nodes 110 may include one or more devices for receiving and transmitting data in network 100. A node 110 may, for example, transmit data to other nodes in the form of packets or other types of data units, such as cells. Each node 110 may also include logic that enables nodes 110 to find each other, determine paths through network 100 for data traffic from source to destination(s), and detect and repair ruptures in network 100 as nodes 110 move, as nodes fail, as battery power changes, as communication path characteristics change, etc.

Figure 2:
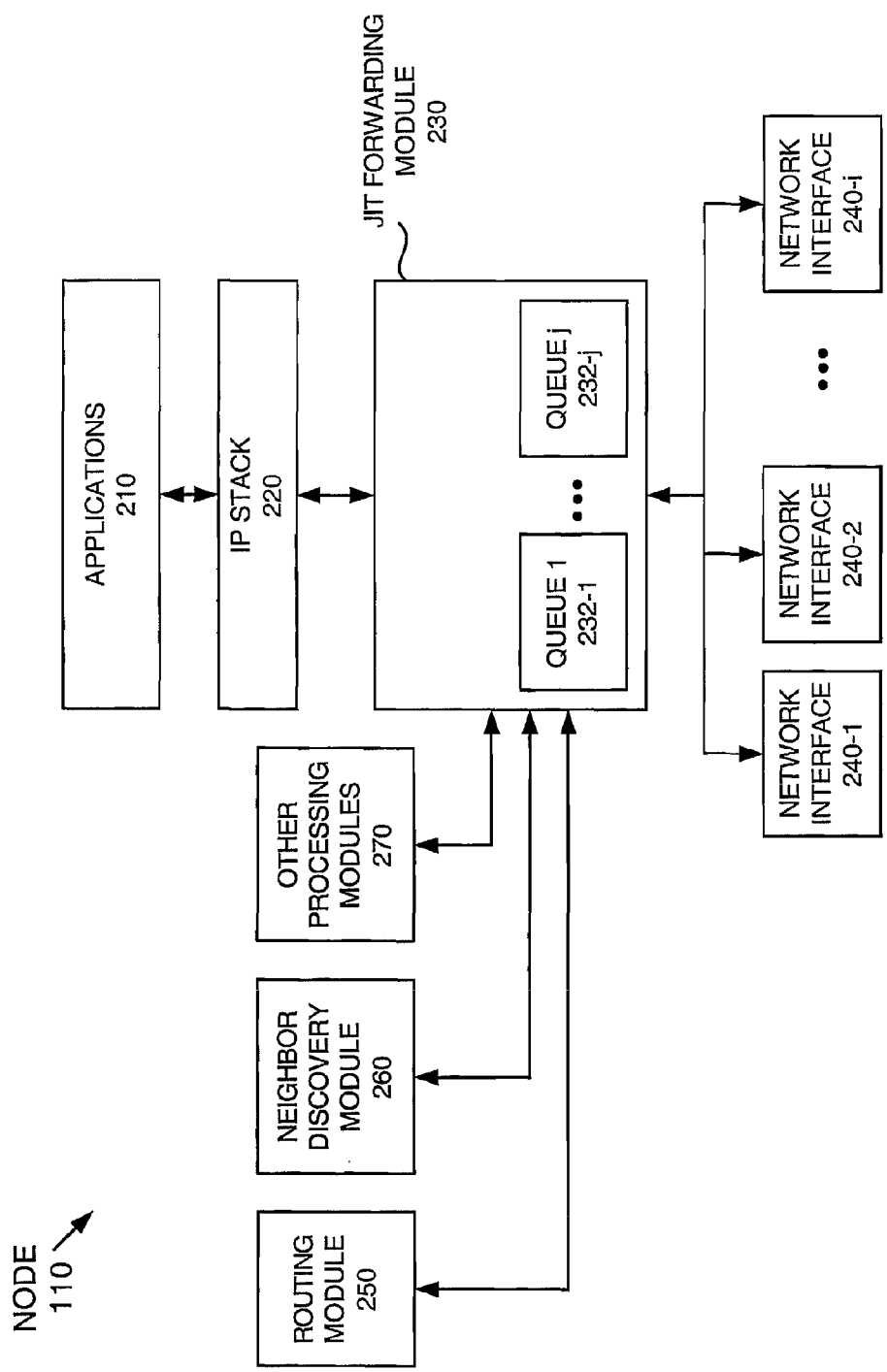
FIG. 2 illustrates an exemplary configuration of a node of FIG. 1 according to one implementation consistent with the principles of the invention.

FIG. 2 illustrates an exemplary configuration of a node 110 according to one implementation consistent with the principles of the invention. The configuration illustrated in FIG. 2 is provided for explanatory purposes only. Other configurations are possible. Moreover, node 110 may include other components than those illustrated in FIG. 2 that aid in receiving, processing, and/or transmitting data.

Node 110 may include a group of applications 210, an Internet Protocol (IP) stack 220, a just-in-time (JIT) forwarding module 230, a group of network interfaces 240-1 through 240-$i$, a routing module 250, a neighbor discovery module 260, and other processing modules 270. Applications 210 may include a group of network applications that generates packets (or other data units) to be transmitted to network 100 and/or processes packets received from network 100. Applications 210 allow users to interact with network 100. Applications 210 may include telnet, file transfer protocol (ftp), e-mail, Internet Relay Chat (IRC), etc.

IP stack 220 includes the Internet Protocol. When sending packets, IP stack 220 determines how to get the packets to their destination. When receiving packets, IP stack 220 determines where the packets belong.

JIT forwarding module 230 may consult routing tables provided by routing module 250 to construct and forward packets to appropriate destinations via neighboring nodes 110 of network 100. As illustrated in FIG. 2, JIT forwarding module 230 may include queues 232-1 through 232$j$ (collectively referred to hereinafter as queues 232), where $j$ is a positive integer greater than or equal to one. It will be appreciated that in alternative implementations consistent with the principles of the invention, another module, such as a queuing subsystem or a radio driver, acting in concert with or on behalf of (or semi-independently of) JIT forwarding module 230, may be responsible for managing queues 232. Moreover, in other implementations, queues 232 may be located externally to JIT forwarding module 230.

The number of queues 232 may correspond to the number of network interfaces 240 associated with node 110. Other mappings of groups of queues to network interfaces 240 are possible. For example, the set of queues associated with a network interface 240-1 through 240-$i$ can be arbitrarily complex (e.g., forming part of a differentiated services scheduler that supports a multiplicity of per-hop behaviors). As another example, one or more network interfaces 240 may support multiple physical or logical channels or circuits. In this situation, a different set of queues may be associated with each channel or circuit that the network interface supports.

In an alternative implementation consistent with the principles of the invention, such a network interface may be treated as if it includes a set of logical network interfaces 240-$m$ through 240-$n$ (not shown). Each logical network interface could be associated with one or more of the individual circuits, channels, or other packet classes that the (physical) network interface supports. The number of logical network interfaces associated with a single physical network interface may be fixed, or the number may vary over time, depending on the number circuits, channels, or other packet classes that presently exist.

The storage of data units (e.g., packets, cells, etc.) in queues 232 may be based on priority or something other than priority. The size of each queue 232-1 through 232-j may be the same or different for network interfaces 240-1 through 240-i (collectively referred to hereinafter as network interfaces 240). In one implementation, the size of each queue 232 may be capped.

Figure 3:
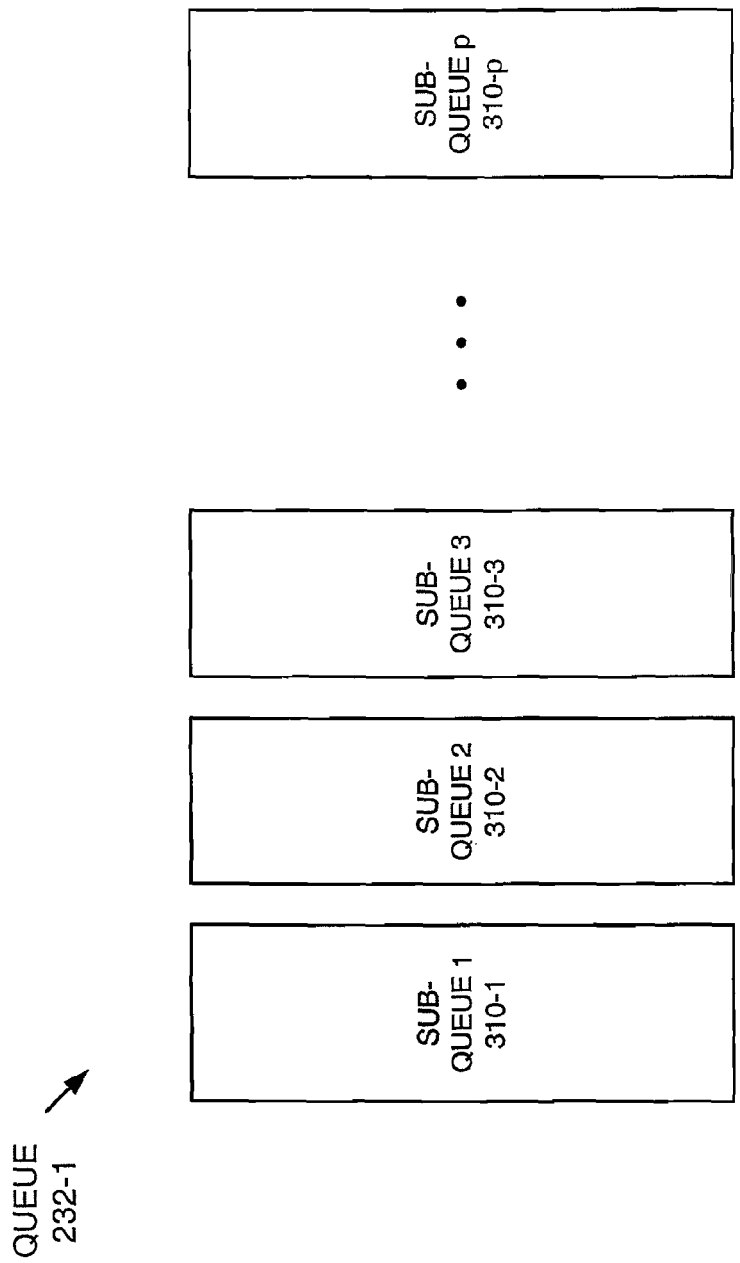
FIG. 3 illustrates an exemplary configuration of a priority queue of FIG. 2 in an implementation consistent with the principles of the invention.

FIG. 3 illustrates an exemplary configuration of queue 232-1 in an implementation consistent with the principles of the invention. It will be appreciated that the other queues 232 may be similarly configured. As illustrated, queue 232-1 may include a group of sub-queues 310-1 through 310-p (collectively referred to hereinafter as sub-queues 310), where p is a positive integer greater than or equal to one. Each sub-queue 310 may store one or more packets for transmission via a network interface 240-1 through 240-i (FIG. 2).

In one implementation, groups of sub-queues 310 may be associated with different priorities. For example, one group of sub-queues 310 may be designated as low priority queues, a second group of sub-queues 310 may be designated as middle priority queues, and a third group of sub-queues 310 may be designated as high priority queues. Alternatively, each sub-queue 310 may be associated with a different priority level. For example, sub-queue 310-1 may be designated as a lowest priority sub-queue, sub-queue 310-2 may be designated as a higher priority sub-queue than sub-queue 310-1, sub-queue 310-3 may be designated as a higher priority sub-queue than sub-queue 310-2, and sub-queue 310-p may be designated as a highest priority sub-queue. Other sub-queue priority designations may alternatively be used.

Returning to FIG. 2, each network interface 240-1 through 240-i may cause packets (or other data units) to be transmitted to or received from a neighboring node 110 via one or more antennas (not shown). The antennas may include, for example, a directional antenna and/or an omni-directional antenna.

Routing module 250 may manage one or more tables that are compatible with JIT forwarding module 230. JIT forwarding module 230 may use multiple tables acquired from routing module 250 based on characteristics, such as a type-of-service (ToS) of a packet, to ultimately generate routing information, control information (e.g., a radio profile) for network interfaces 240, and an indication of a correct queuing discipline to use with the packet. It will be appreciated that ToS is sometimes alternatively referred to as "Quality of Service" (QoS). Typically, a ToS indicator is assigned to a packet by an application to specify particular service parameters. The service parameters may include transmission power requirements, priority indicators (e.g., "urgent" or "low delay"), error ratios, resilience, transit delay, and so forth.

In one implementation consistent with the principles of the invention, routing module 250 may provide JIT forwarding module 230 with the information that it needs to determine, based on the ToS and other characteristics of a packet (which may include the type and value of a destination identifier), (1) one or more next-hop addresses that identify the next hop (i.e., neighboring node) or next hops to which a packet is to be transmitted; and (2) for each next hop, the identifier of the radio profile to be used when transmitting the packet to that next hop. JIT forwarding module 230 may use each radio profile identifier to index into a radio profile table that is designated for this particular packet. Different interfaces 240 may be associated with different radio profile structures to reflect the fact that interfaces 240 may be different types of network interfaces. JIT forwarding module 230 may forward packets to the correct network interface 240-1 through 240-i, or network interfaces 240, for transmission. Additional information regarding radio profiles and the operation of routing module 230 may be obtained from copending, commonly assigned, U.S. patent application Ser. No. 09/748,621, filed Dec. 22, 2000, and entitled "Architecture and Mechanism for Forwarding Layer Interfacing for Networks," the entire contents of which are expressly incorporated by reference herein.

Neighbor discovery module 260 may store location information for node 110 and any neighboring nodes 110 in network 100. For example, neighbor discovery module 260 for node A 110 (FIG. 1) may store location information for neighboring (or next hop) nodes B, D, and E 110. Neighbor discovery module 260 may transfer next hop location data to JIT forwarding module 230. JIT forwarding module 230 may place node 110's location information into messages that are to be broadcast, for example, via an omni-directional antenna or one or more directional antennas to neighboring nodes 110.

Other processing modules 270 may include other well-known processing components that may be included in a node in a communications network, such as network 100. Other processing modules 270 may, for example, include a location determining component, such a global positioning satellite (GPS) driver that receives position and orientation data and determines latitude, longitude, and an orientation that corresponds to the position and orientation data. The GPS driver may further, based on historical position and orientation data, determine a current heading of node 110. Other processing modules 270 may also include a link characterization component that determines link quality and power control information related to transmitting and receiving packets to and from neighboring nodes 110 of network 100.

Exemplary Processing

Figure 4:
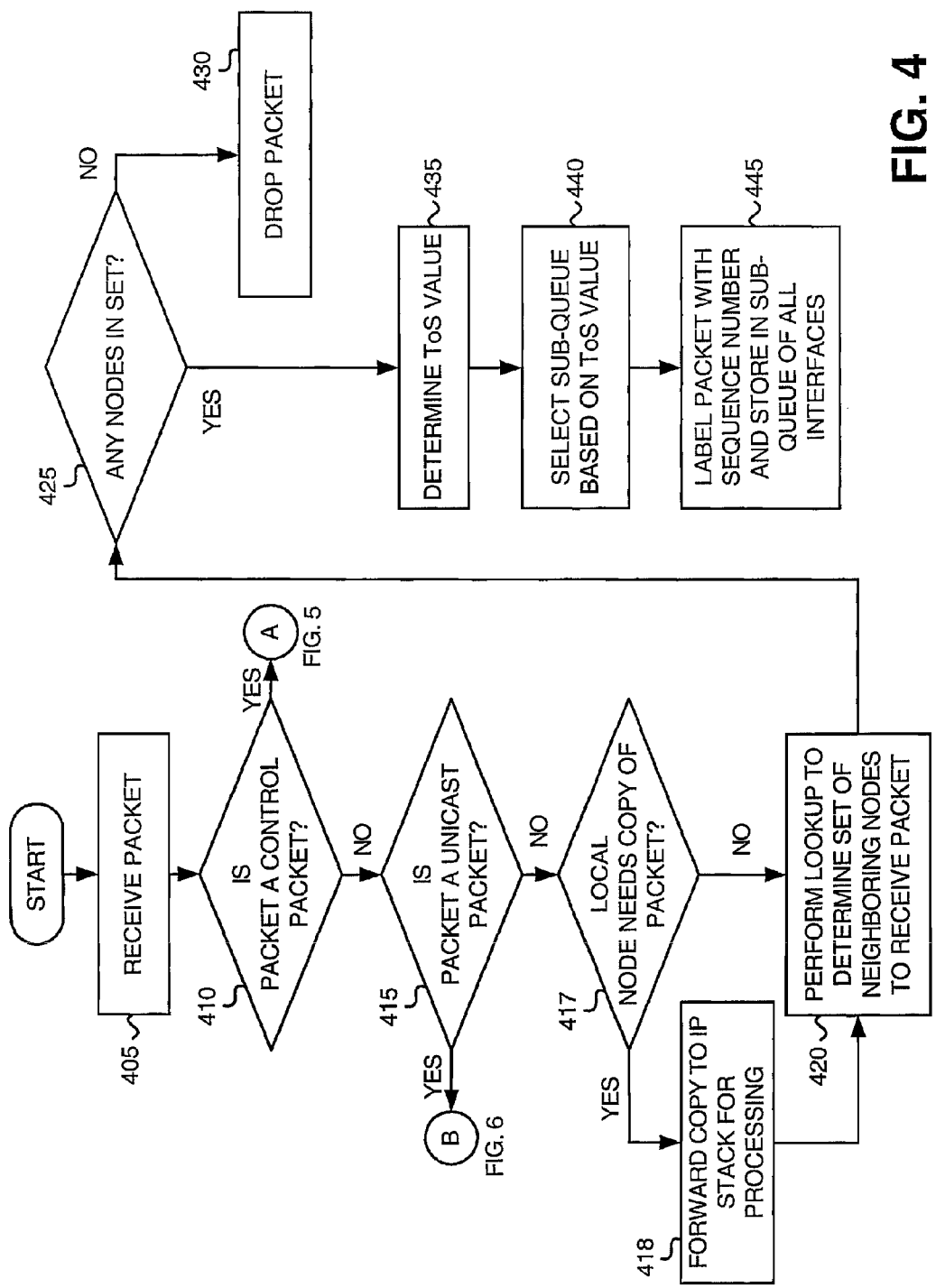
FIGS. 4-6 illustrate an exemplary process for enqueuing packets to be transmitted from the node of FIG. 2 in an implementation consistent with the principles of the invention.
Figure 5:
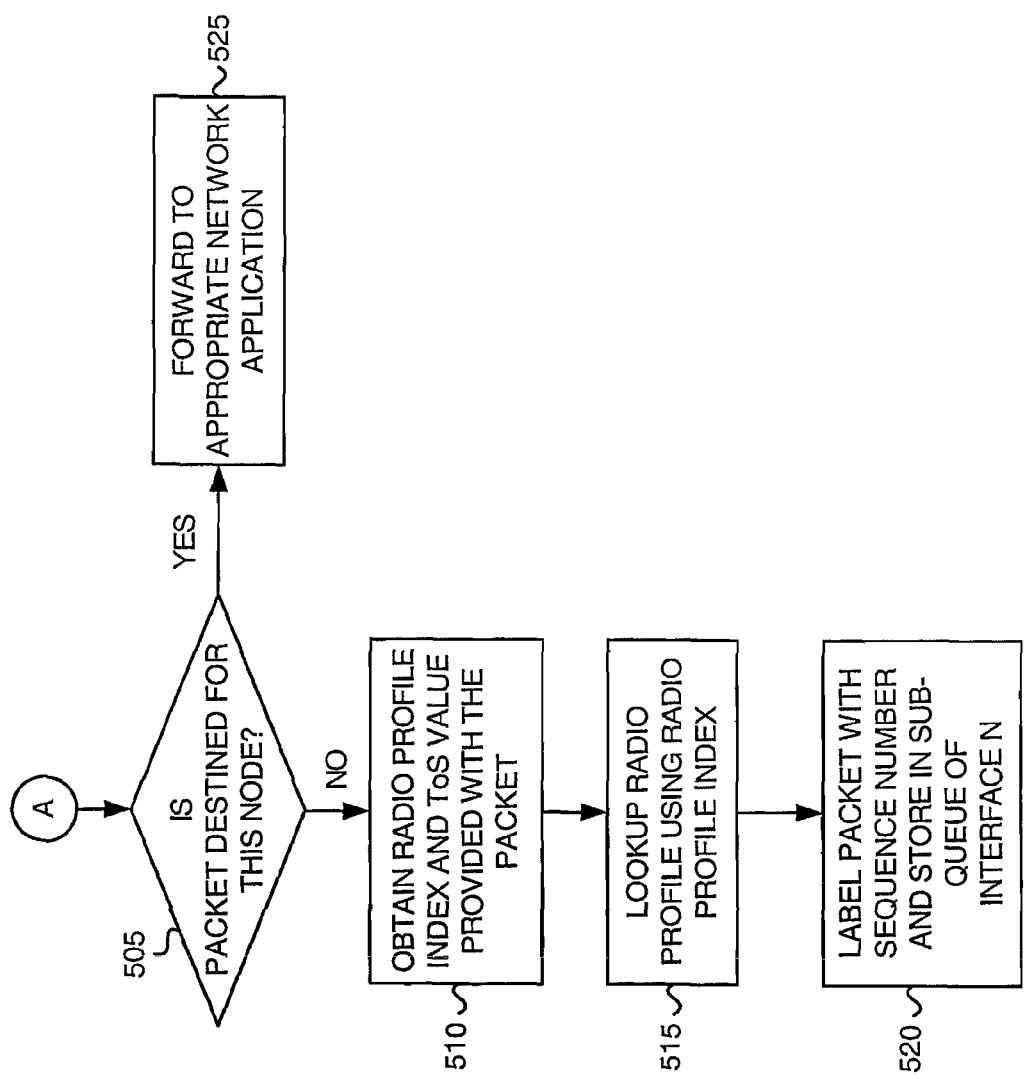
Figure 6:
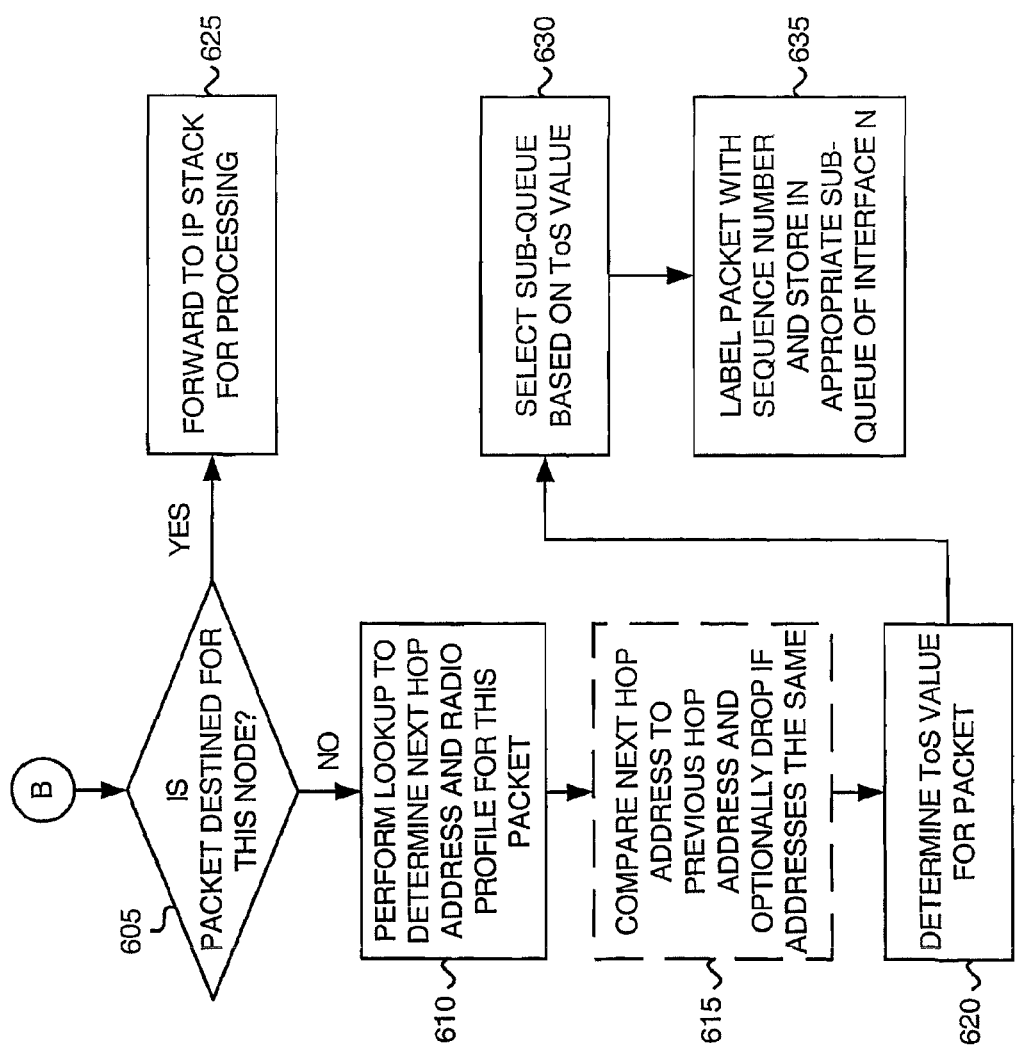

FIGS. 4-6 illustrate an exemplary process, performed by JIT forwarding module 230, for enqueuing packets to be transmitted from node 110 in an implementation consistent with the principles of the invention. It will be appreciated that in other implementations, some of the acts described below may be performed by another module working on behalf of or in conjunction with JIT forwarding module 230. Processing may begin with JIT forwarding module 230 receiving a packet (act 405, FIG. 4). The packet may be received locally from, for example, IP stack 220, routing module 250, neighbor discovery module 260, other processing modules 270, or via an interface from a neighboring node 110. Upon receipt of the packet, JIT forwarding module 230 may determine whether the packet is a control packet (act 410). For example, JIT forwarding module 230 may determine that the packet is a heartbeat packet, a link state update (LSU) packet, or the like.

If the packet is a control packet, JIT forwarding module 230 may determine if the packet is destined for this particular node 110 (act 505, FIG. 5). JIT forwarding module 230 may make this determination by, for example, examining a destination address associated with the packet. When the destination address associated with the packet matches node 110's network address, then JIT forwarding module 230 may determine that the packet is destined for this node 110. In such an event, JIT forwarding module 230 may forward the packet to the appropriate network application 210 within node 110 (act 525).

If the packet to be processed is a control packet that is not destined for this node 110, no next hop lookup is performed because it is assumed that all control packets are single hop only (therefore the destination address provided is either broadcast or a neighbor's address). In other implementations, control packets may be processed in a manner similar to that described below with respect to unicast and/or multicast packets. The module that forwards the control packet to JIT forwarding module 230 (e.g., module 250, 260, or 270) may be responsible for explicitly specifying the radio profile index and ToS value to be used when processing this packet. Therefore, if JIT forwarding module 230 determines the control packet is destined for another node 110, JIT forwarding module 230 may obtain the radio profile index and ToS value from the control information provided with the packet (act 510). JIT forwarding module 230 may use the radio profile index to lookup a particular radio profile in the table associated with control packets of this particular type (act 515). JIT forwarding module 230 may use the appropriate radio profile table provided by routing module 250, neighbor discovery module 260, and/or other processing modules 270. In one implementation consistent with the principles of the invention, a unique radio profile table may be used and managed by routing module 250, neighbor discovery module 260, and each module within other processing modules 270. The radio profile identifies the particular network interface 240-1 through 240-i that should receive this packet. It is assumed hereinafter that network interface N 240 is to receive this control packet, where $1 \leq N \leq i$. The ToS value may specify, among other things, the priority to be given to this control packet. In one implementation consistent with the principles of the invention, control packets are given a "highest priority" queuing discipline, so that they are guaranteed to have absolute priority over other types of traffic.

Once the network interface lookup is performed (via the radio profile), JIT forwarding module 230 may assign a sequence number to the packet and store the packet in the appropriate sub-queue 310 that is associated with interface N 240 (act 520). As will be described in additional detail below, the sequence number allows JIT forwarding module 230 to reorder packets within priority queues 232. Therefore, node 110 need not transmit this sequence number to other nodes 110 once the packet has left queues 232. In one implementation, the sequence number is a 32-bit value that is shared among all network interfaces 240. Since the packet is a control packet, JIT forwarding module 230 may, for example, store the packet in the highest priority sub-queue p 310 within queue N 232 associated with interface N 240.

If, in act 410 (FIG. 4), JIT forwarding module 230 determines that the packet is not a control packet, JIT forwarding module 230 may determine if the packet is a unicast packet (act 415). If the packet is a unicast packet, JIT forwarding module 230 may determine if the packet is destined for this node 110 (act 605, FIG. 6). JIT forwarding module 230 may make this determination by, for example, examining a destination address associated with the packet. When the destination address associated with the packet matches node 110's network address, then JIT forwarding module 230 may determine that the packet is destined for this node 110. In such an event, JIT forwarding module 230 may forward the packet to IP stack 220 within node 110 for processing (act 625).

If the packet is a unicast packet that is destined for another node, JIT forwarding module 230 may perform a lookup to determine the next hop address and the radio profile to use for this packet (act 610). As set forth above, the radio profile specifies which network interface 240-1 through 240-i is to be used to transmit the packet. It will be appreciated that other techniques (e.g., dedicated tables, part of the next hop table, etc.) may be used to identify the appropriate network interface 240-1 through 240-i from which a packet is to be transmitted. If the next hop address lookup indicates that there is no next hop, JIT forwarding module 230 may drop the packet.

JIT forwarding module 230 may optionally compare the determined next hop address to the previous hop address (act 615). If the two addresses are equal, this may indicate that the packet is in a loop. JIT forwarding module 230 may optionally drop the packet (act 615). In many network topologies, loops are short-lived and dropping packets that are in a loop may result in dropping packets that may actually become routable within a very short amount of time. Therefore, in other implementations consistent with the principles of the invention, JIT forwarding module 230 may not perform act 615. Alternatively or in conjunction with act 615, JIT forwarding module 230 may base decisions whether to drop the packet on a time to live (TTL) value associated with the packet.

JIT forwarding module 230 may determine a ToS value for the packet (act 620). If the packet has been generated by this particular node 110, JIT forwarding module 230 may determine a ToS value for the packet, assigning a default ToS value if unable to determine a ToS value (e.g., for non-IP data). For IP data, JIT forwarding module 230, or alternatively, a convergence layer or module above JIT forwarding module 230 may, for example, determine a ToS value by examining the ToS byte in the IP header. If the packet is mid-path (i.e., node 110 is an intermediate node along the path toward the packet's destination), JIT forwarding module 230 may, for example, obtain the ToS value for the packet from the ToS field in the packet's header.

JIT forwarding module 230 may select a queuing discipline for the packet based on the ToS value (act 630). Various techniques for differentially treating packets are possible. For example, some systems may provide a set of prioritized first-in, first-out (FIFO) queues. In these situations, the queuing discipline returned can be the particular priority sub-queue 310 into which the packet is to be inserted. In one implementation, all nodes 110 may have the same, pre-configured, ToS-to-queuing discipline mapping.

JIT forwarding module 230 may assign a sequence number to the packet and store the packet in the appropriate sub-queue 310 that is associated with interface N 240 (act 635). As indicated above, the sequence number allows JIT forwarding module 230 to reorder packets within queues 232.

In an alternative implementation consistent with the principles of the invention, JIT forwarding module 230 may ignore the next hop address lookup operation (act 610 in FIG. 6), and instead may place the unicast packet on a priority sub-queue 310 associated with a network interface 240-1 through 240-i even if no next hop was specified. JIT forwarding module 230 may distribute such unicast packets among network interfaces 240 so that no single network interface becomes unfairly overburdened. When the unicast packet finally gets to the head of sub-queue 310 for transmission, an appropriate next hop may have become available.

If, in act 415 (FIG. 4), JIT forwarding module 230 determines that the packet is not a unicast packet (JIT forwarding module 230 may then determine the packet to be a multicast packet), JIT forwarding module 230 may determine whether the local node needs a copy of the packet (act 417). If the local node needs a copy of the packet, JIT forwarding module 230 may forward a copy of the packet to IP stack 220 for processing (act 418). It will be appreciated based on the following description that acts 417 and 418 may alternatively be performed between acts 425 and 435. If the local node does not need a copy of the packet (act 417) or after JIT forwarding module 230 forwards a copy of the packet to IP stack 220 (act 418), JIT forwarding module 230 may perform a lookup to determine the set of neighboring nodes 110 that are to receive the packet (act 420). The set of neighboring nodes 110 may contain an indication of whether this particular node 110 should receive a copy of the multicast packet. If this is a transit packet and this particular node 110 is to receive a copy of the packet, JIT forwarding node 230 may forward a copy of the packet to IP stack 220 for processing.

JIT forwarding module 230 may determine whether there are any neighboring nodes 110 identified in the set of neighboring nodes 110 (act 425). If there are no nodes 110 identified in the set, JIT forwarding module 230 may drop the packet (act 430). As an alternative, JIT forwarding module 230 may, in response to receiving a multicast packet, enqueue a copy of the packet on a sub-queue 310 in all queues 232, even if no neighboring nodes 110 are identified in act 425. The rationale is that by the time one or more of these packets make it to the head of a sub-queue 310, the next hop table might have changed such that a neighboring node 110 should be receiving a packet at this time. In this way, JIT forwarding module 230 may avoid dropping packets that this node 110 is to relay.

If the set of neighboring nodes 110 identifies one or more neighboring nodes 110 to receive the packet, JIT forwarding module 230 may determine a ToS value for the packet (act 435). If JIT forwarding module 230 is unable to determine a ToS value because, for example, the packet contains non-IP data, JIT forwarding module 230 may assign a default value. For IP data, JIT forwarding module 230, or alternatively, a convergence layer or module above JIT forwarding module 230 may, for example, determine a ToS value by examining the ToS byte in the IP header. As described above, a ToS value may be included in the header of packets, so it can be easily obtained during forwarding operations at intermediate nodes 110 in network 100.

JIT forwarding module 230 may select a queuing discipline for the packet based on the ToS value (act 440). All copies of this packet, irrespective of which neighboring node 110 this packet is to be transmitted, may be handled with the selected queuing discipline. Alternatively, the queuing discipline may be selected on a per-network-interface basis. JIT forwarding module 230 may assign a sequence number to the packet and store the packet in the appropriate sub-queue 310 for each network interface 240-1 through 240-i, regardless of the specific neighboring nodes 110 identified to receive the packet (act 445). The possibility exists that, during the time when the multicast packet is enqueued and later de-queued, a neighboring node 110 may become reachable via a network interface 240-1 through 240-i that was not reachable when JIT forwarding module 230 determines the set of neighboring nodes 110 to receive the packet, described in act 420 above. In this way, all reachable neighboring nodes 110 will receive a copy of the packet when the packet is later transmitted by this particular node 110. In an alternative implementation consistent with the principles of the invention, act 445 may alternatively enqueue a copy of the packet on those network interfaces through which one of the designated neighboring nodes is presently reachable. In this case, JIT forwarding module 230 may, in act 445, consult the radio profile associated with each neighboring node, or employ alternate means, to determine the appropriate subset of network interfaces 240 to which a copy of the packet should be enqueued.

Figure 7:
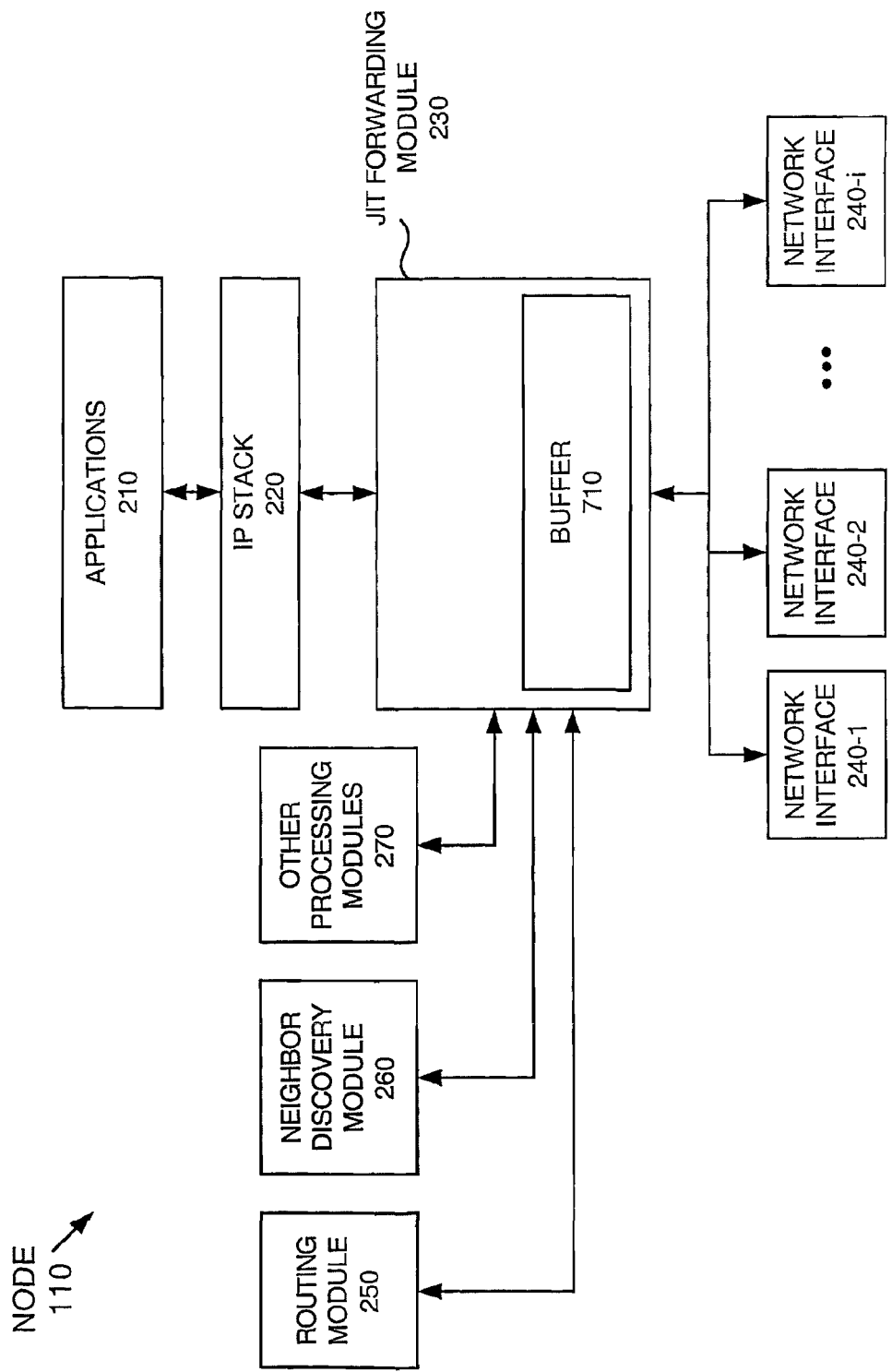
FIG. 7 illustrates an exemplary alternative configuration of a node of FIG. 1 in an implementation consistent with the principles of the invention.

In an alternative implementation, individual queues 232 and sub-queues 310 may be implemented in JIT forwarding module 230 in the form of one or more buffer pools (or virtual buffer pools). FIG. 7 illustrates an exemplary alternative configuration of node 110 in an implementation consistent with the principles of the invention. As illustrated, each queue 232-1 through 232-j may be served by a buffer pool within buffer pools 710 that is distinct from the pool used by queues 232 associated with other network interfaces 240. Buffer pools 710 may include a set of one or more buffer pools, each of which could be an actual pool of buffers or, alternatively, a virtual pool allocated from a centrally-managed pool. In this implementation, a pool of a finite size within buffer pools 710 may be assigned for each network interface 240-1 through 240-i. In this way, different buffers for a particular buffer pool assigned to a network interface 240-1 through 240-i may act as different sub-queues 310 for that interface 240-1 through 240-i. The size B of each buffer pool may be configurable on a per network interface 240-1 through 240-i basis. In one implementation consistent with the principles of the invention, each buffer within a buffer pool may store a single packet of a maximum size appropriate for network 100 (e.g., 1500 bytes for an Ethernet environment).

Figure 8:
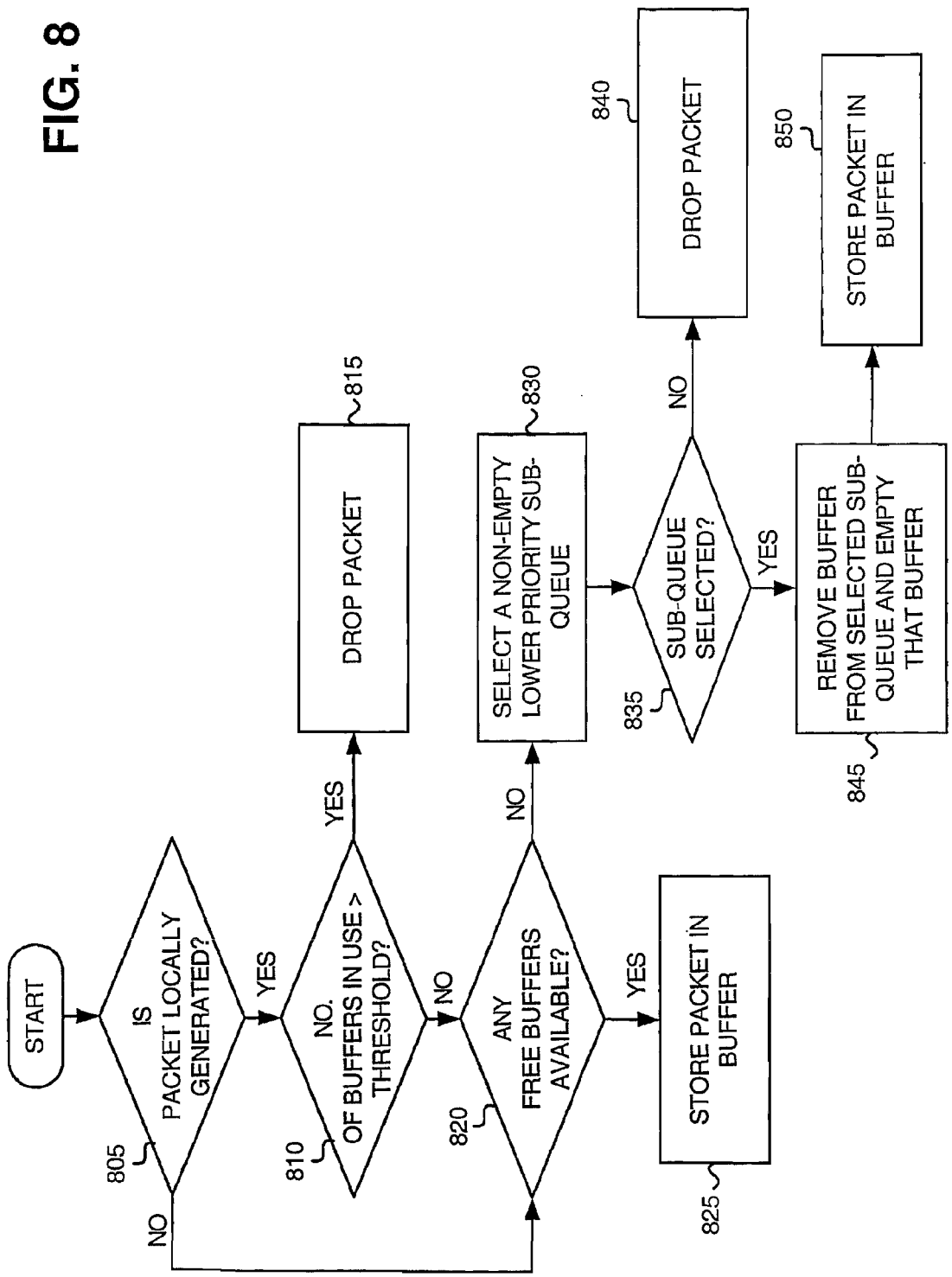
FIG. 8 illustrates an exemplary process for enqueuing packets to be transmitted from the node of FIG. 7 in an alternative implementation consistent with the principles of the invention.

FIG. 8 illustrates an exemplary process, performed by JIT forwarding module 230, for enqueuing packets to be transmitted from node 110 in this alternative implementation consistent with the principles of the invention. It will be appreciated that in other implementations, some of the acts described below may be performed by another module working on behalf of or in conjunction with JIT forwarding module 230. Processing may begin with JIT forwarding module 230 receiving a packet to queue for network interface N 240. In response, JIT forwarding module 230 may determine whether the packet has been locally generated (act 805). JIT forwarding module 230 may determine, for example, that a packet has been locally generated if, for example, it was supplied by IP stack 220 or by a control application 210 running on node 110.

If the packet has been locally generated, JIT forwarding module 230 may determine if the number of already enqueued packets at equal or higher priorities (or number of buffers in the virtual buffer pool for interface N from buffer 710 at equal or higher priority) exceeds a configurable local threshold W (act 810). In one implementation consistent with the principles of the invention, the threshold W may be configurable on a per-network interface 240-1 through 240-i basis so as to prevent locally generated floods from pushing out mid-path packets that have already been the recipient of investment of time and energy by network 100. If the packet is locally generated and the number of buffers in use for network interface N 240 exceeds threshold W, JIT forwarding module 230 may drop the packet (act 815). In an alternative implementation consistent with the principles of the invention, transit and locally-originated packets may be treated equally, in which case acts 805 and 810 may be bypassed.

If the packet has not been locally generated or the number of buffers in use for network interface N 240 at equal or higher priority does not exceed threshold W, JIT forwarding module 230 may determine if any free buffers for interface N 240 are available (act 820). If a free buffer exists, JIT forwarding module 230 may store the packet in the available buffer (act 825).

If no free buffers for interface N 240 are available, JIT forwarding module 230 may steal a buffer from a lower priority sub-queue 310 for network interface N 240. JIT forwarding module 230 may examine sub-queues 310 starting with the lowest configured priority and ending with the priority one less than that of the current packet. JIT forwarding module 230 may select the first of those lower-priority sub-queues 310 that contains at least one buffer (act 830). If JIT forwarding module 230 is unable to select a sub-queue 310 (act 835), JIT forwarding module 230 may drop the packet (act 840). If, on the other hand, JIT forwarding module 230 is able to select a sub-queue 310 (act 835), JIT forwarding module 230 may remove a buffer from that sub-queue and drop the packet that was occupying that buffer (act 845). Then, JIT forwarding module 230 may store the current packet in that buffer (act 850).

When choosing a buffer to remove from the selected lower-priority sub-queue 310, JIT forwarding module 230 may remove the buffer from the tail of the sub-queue. Alternatively, JIT forwarding module 230 may, for example, remove a buffer from the head of the sub-queue or may perform random early drop (RED) in which a random packet is dropped. JIT forwarding module 230 may record statistics about any buffer shortages.

Figure 9:
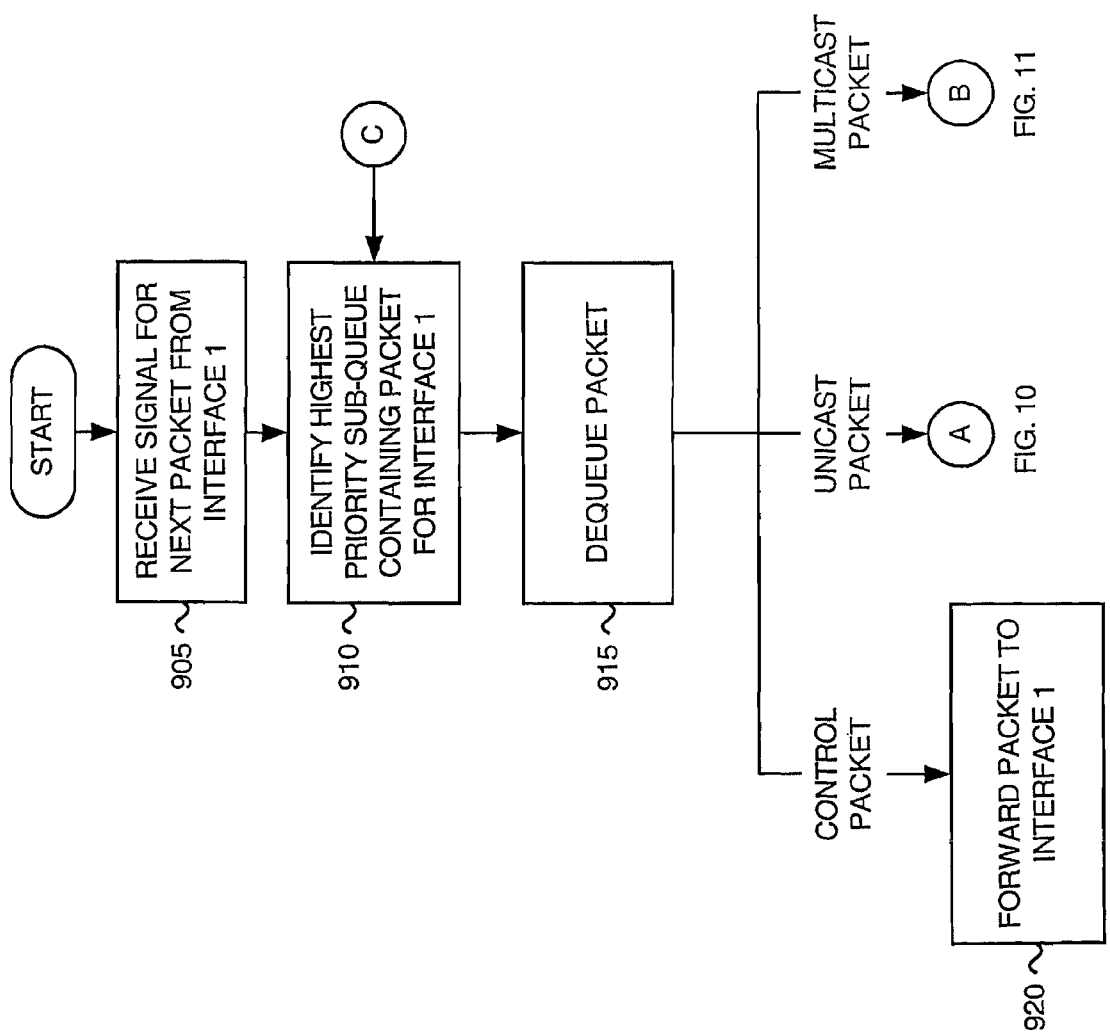
FIGS. 9-11 illustrate an exemplary process for dequeuing packets in an implementation consistent with the principles of the invention.
Figure 10:
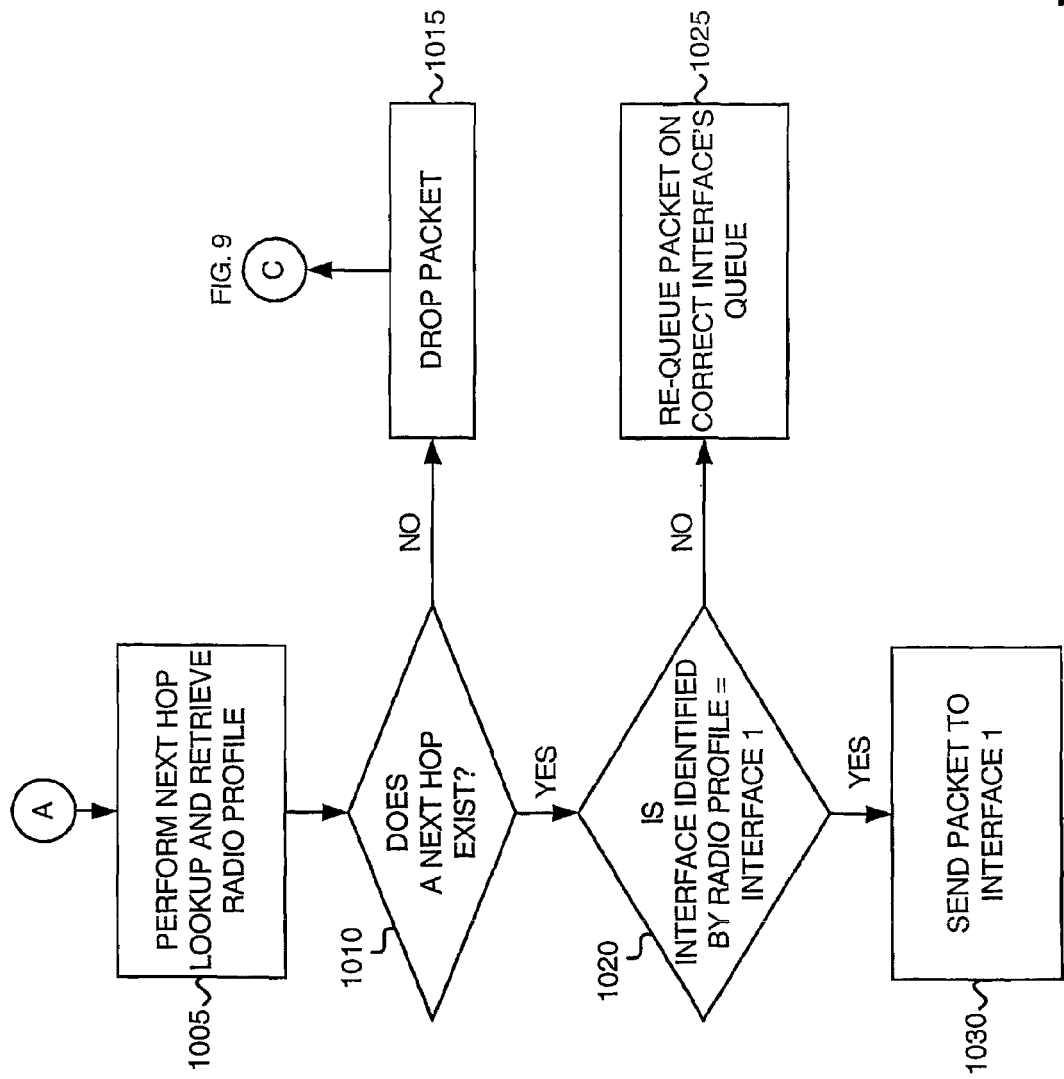
Figure 11:
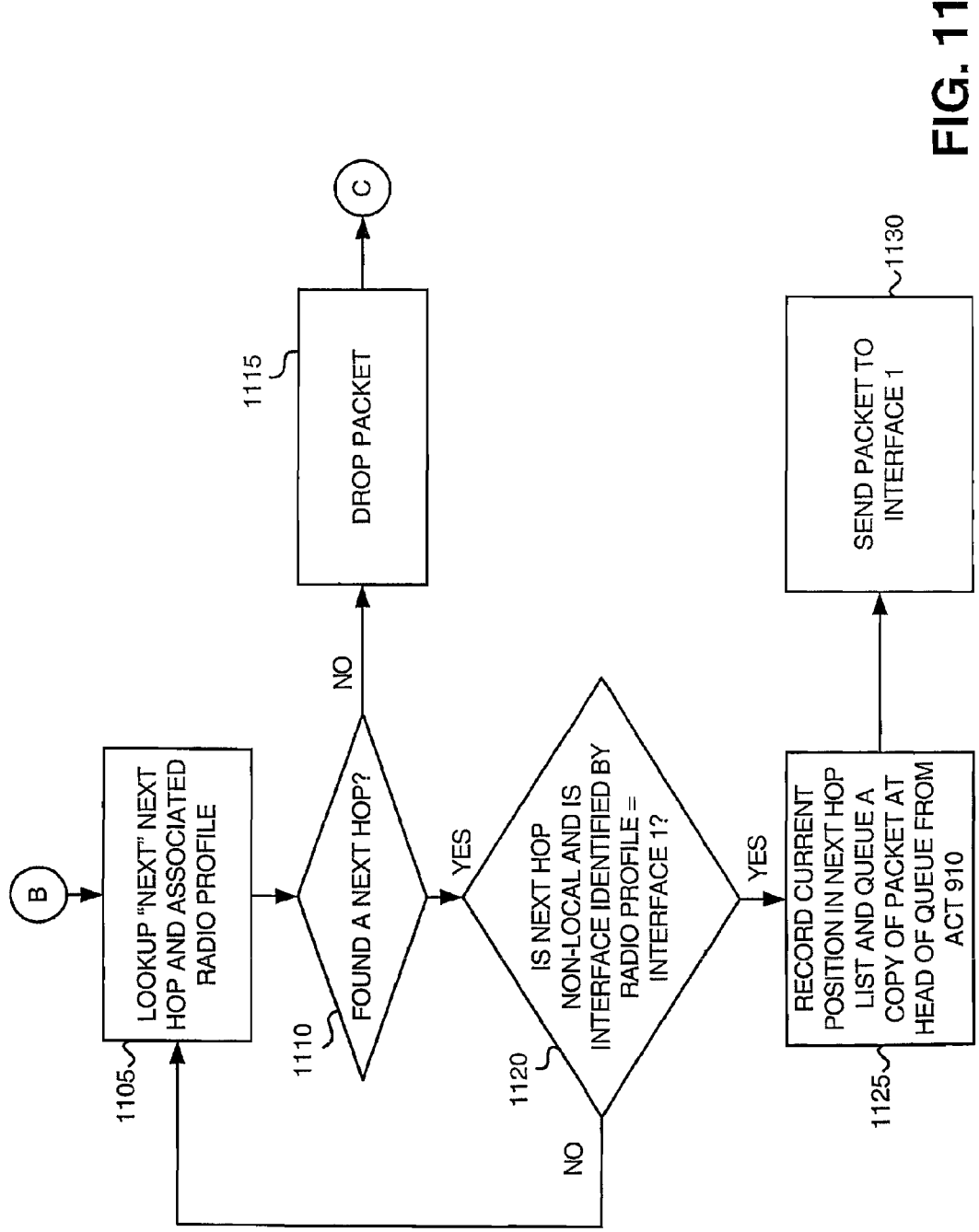

FIGS. 9-11 illustrate an exemplary process for dequeuing packets, performed by JIT forwarding module 230, in an implementation consistent with the principles of the invention. It will be appreciated that in other implementations, some of the acts described below may be performed by another module working on behalf of or in conjunction with JIT forwarding module 230. Processing may begin with JIT forwarding module 230 receiving a signal from a network interface 240-1 through 240-i, such as network interface 240-1, indicating that network interface 240-1 is ready to transmit the next packet (act 905, FIG. 9). In response, JIT forwarding module 230 may identify the highest priority sub-queue 310 within queue 232-1 containing a packet for network interface 240-1 (act 910). JIT forwarding module 230 may dequeue the packet at the head of the highest priority sub-queue 310 (act 915).

If no sub-queue 310 presently contains a packet for network interface 240-1, in one implementation consistent with the principles of the invention, JIT forwarding module 230 may record the fact that network interface 240-1 is ready to accept the next packet for transmission. Then, when a packet is later enqueued on any sub-queue 310 associated with network interface 240-1, JIT forwarding module 230 may continue with act 910 (FIG. 9).

If the packet is control traffic, or user data traffic targeted directly at a particular network interface (rather than at the forwarding layer), JIT forwarding module 230 may forward the packet to network interface 240-1 after adding/manipulating headers as appropriate (act 920). It will be appreciated that the radio profile index and the ToS bits may be held along with the packet while the packet is stored in sub-queue 310.

If the packet is a unicast packet, JIT forwarding module 230 may perform another next hop lookup on the packet and retrieve the radio profile for this packet (act 1005, FIG. 10). JIT forwarding module 230 may determine if a next hop exists (act 1010). If the lookup operation specifies "no next-hop," JIT forwarding module 230 may drop the packet and processing may return to act 910 (FIG. 9) with JIT forwarding module 230 identifying the highest priority sub-queue 310 containing a packet for network interface 240-1. In this situation, the final destination may have become unreachable in the time that the packet was waiting in sub-queue 310.

Optionally, JIT forwarding module 230 may determine whether the packet is in a loop. To do so, JIT forwarding module 230 may compare the newly evaluated next hop address to the previous hop address. JIT forwarding module 230 may drop the packet if it is determined to be in a loop. Alternatively or in conjunction with the above, JIT forwarding module 230 may make drop decisions based on a TTL value associated with the packet.

JIT forwarding module 230 may determine if the network interface identified in the radio profile retrieved in act 1005 matches network interface 240-1 (the network interface requesting a packet in act 905) (act 1020). It will be appreciated that as an alternative or in addition to the above, JIT forwarding module 230 may use other techniques for identifying the network interface. If the network interface is not the correct network interface (e.g., the network interface identified in the radio profile does not match network interface 240-1 that requested a packet in act 905), JIT forwarding module 230 may requeue the packet on the correct sub-queue 310 in network interface 240's queue 232 (act 1025). JIT forwarding module 230 may enqueue the packet at the correct location in new priority queue 232 using the sequence number associated with the packet. That is, when enqueueing, JIT forwarding module 230 may search through new queue 232 for the correct position (e.g., the correct sub-queue 310 and the correct location within the sub-queue). When FIFO queues are used, JIT forwarding module 230 may scan the appropriate sub-queue 310 within new queue 232 for an insertion point where sequence numbers ahead of the requeued packet will be smaller, and sequence numbers behind the requeued packet will be larger. Placement of the packet within the new sub-queue 310 may also take into consideration sequence number rollover. As an alternative to requeuing a single packet, JIT forwarding module 230 may perform next hop address lookup operations on the first M packets (where M may be a configurable value) in sub-queue 310 (or the entire sub-queue 310), so that a number of packets could potentially be requeued at the same time.

If the network interface identified in the radio profile matches network interface 240-1 that requested a packet in act 905, JIT forwarding module 230 may forward the packet to network interface 240-1 (act 1030). Since the next hop node 110 for this packet may have changed between the original enqueue and this dequeue operation, JIT forwarding module 230 may pass the newest next hop address and radio profile to network interface 240-1 and not the original next hop address and radio profile that were determined when the packet was enqueued.

If the packet is a multicast packet, JIT forwarding module 230 walks through the list (or set) of next hops, as designated in the forwarding tables for the multicast packet, until either the end of the list is reached or a neighboring node has been found whose associated network interface matches the network interface (i.e., network interface 240-1) requesting a packet. It should be appreciated that the list of next hops for this multicast packet, and the radio profile associated with each of these next hops, may change at any time.

This iterative process will now be described in further detail. JIT forwarding module 230 looks up the next hop and associated radio profile for this multicast packet (act 1105, FIG. 11). If JIT forwarding module 230 reaches the end of the list of next hops (act 1110), JIT forwarding module 230 may drop the packet (act 1115) and processing may return to act 910 (FIG. 9) with JIT forwarding module identifying the highest priority sub-queue 310 containing a packet for network interface 240-1.

If a next hop is found in the next hop list (act 1110), JIT forwarding 230 may determine if the next hop is non-local (act 1120), since if the local node needs a copy of this packet, it has already been supplied in act 418 (FIG. 4). JIT forwarding 230 may also determine if the next hop is associated with the network interface (i.e., network interface 240-1) requesting service (act 1120). It may be appreciated that the next hop list for this packet may contain next hops associated with network interfaces other than 240-1. To determine if the next hop is associated with network interface 240-1, JIT forwarding module 230 may determine if the network interface identified in the radio profile associated with this next hop (as identified in act 1105) matches network interface 240-1. JIT forwarding module 230 may use alternative or additional means to determine if the next hop is associated with the desired network interface 240-1.

If, in act 1120, JIT forwarding module 230 determines that the necessary criteria have not been met, processing may return to act 1105. If, one the other hand, a suitable next hop is found (act 1120), JIT forwarding module 230 may make a copy of the multicast packet and queue that copy on the head (i.e., front) of the appropriate sub-queue 310 (i.e., the sub-queue selected in act 910) for network interface 240-1 (act 1125). JIT forwarding 230 may also record the current position in the next hop list (act 1125), so that JIT forwarding module 230 may continue on from that point the next time network interface 240-1 requests a packet and JIT forwarding module 230 selects the current packet (e.g., as in FIG. 9, acts 910 and 915) for processing.

JIT forwarding module 230 may forward the multicast packet to network interface 240-1 (act 1130). In an alternative implementation, JIT forwarding module 230 may, after making a copy of the multicast packet in act 1125, instead save the multicast packet, and send the copy in act 1130.

In some situations, it may be important to limit the total number of copies of a multicast packet that are sent, even at the expense of missing neighboring nodes that may be added to the forwarding tables during the time that a multicast packet is being processed. As a modification to the above processing, JIT forwarding module 230 may, at the time that a multicast packet reaches the head of a sub-queue 310 for the first time and was dequeued, record all of the neighboring nodes currently associated with that multicast packet, and then only consider those original neighboring nodes as eligible next hops when the associated network interface 240 requests additional packets.

In other situations, it may be important to increase the likelihood that all of the neighboring nodes that the forwarding tables indicate should receive a copy of a multicast packet are, in fact, sent a copy. If the association between next hops and network interfaces 240 is changing rapidly, and one of the network interfaces, e.g. **240-*i*, is significantly faster than another, e.g. 240-*j*, it is possible to lose multicast packets that might otherwise be deliverable. This could occur when a copy of a multicast packet on network interface 240-*i*'s highest priority sub-queue 310 arrives at the head of the sub-queue 310, but all the lookup operations specify transmission on network interface 240-*j*. Some time later a copy of the same multicast packet may arrive at the head of network interface 240-*j*'s highest priority sub-queue 310, but the forwarding tables may have changed and all lookup operations now specify network interface 240-*i*. One way of averting this situation would be a "scorecard" approach, where JIT forwarding module 230 records which of the next hops for a multicast packet have already been sent a copy. The scorecard could be used to ensure that JIT forwarding module 230 requeues a copy of the multicast packet for the current network interface (e.g., 240-*i*) associated with any given next hop (in a manner similar to FIG. 10, acts 1020 and 1025), until that next hop is sent exactly one copy of the packet. At some point, a lookup operation might indicate that a given next hop is no longer reachable via any of the network interfaces 240, in which case JIT forwarding module 230** might cease attempting to send the packet to that next hop. It may be appreciated that the "scorecard" approach, in addition to increasing the likelihood that all designated next hops will receive a copy of a multicast packet, also reduces the likelihood that a neighboring node will receive extra copies of the packet.

In an alternative implementation consistent with the principles of the invention, node 110 may include a separate queue or memory for storing multicast packets. In this situation, JIT forwarding module 230 may store a virtual placeholder for each multicast packet in a sub-queue 310 of one or all of queues 232. When the first of the one or more virtual placeholders for a multicast packet gets to the head of a sub-queue 310 and is dequeued, JIT forwarding module 230 may retrieve the multicast packet from the separate queue or memory, identify all next hops that need to receive a copy of the multicast packet, and identify all network interfaces 240 that are associated with at least one of the identified next hops. JIT forwarding module 230 may then place at least one copy of the multicast packet at the head of a sub-queue 310 of at least one queue 232 associated with each of the identified network interfaces 240. When any remaining virtual placeholder for the same multicast packet later reaches the head of a sub-queue 310 and is dequeued, JIT forwarding module 230 may ignore that virtual placeholder, since copies of the multicast packet have already been enqueued and dequeued, wherever needed. An advantage of this alternative implementation is that all multicast neighbors for all network interfaces 240 are determined at the same time.

CONCLUSION

Implementations consistent with the principles of the invention provide just-in-time forwarding decisions to ensure that data being transmitted by a node in a communications network reaches its intended destination.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 4-6 and 8-11, the order of the acts may be varied in other implementations consistent with the present invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for transmitting data units from a node in a communications network, the method comprising:

placing a data unit in a first transmission queue associated with a network interface of the node based at least in part on initial forwarding information that specifies information related to transmitting the data unit from the node to a second node in the communication network, wherein the second node is distinct from and physically separated from the node;

determining, at the node, that the data unit has reached a head of the first transmission queue;

upon the data unit reaching the head of the first transmission queue, altering, at the node, the initial forwarding information based at least in part on updated routing information; and transmitting the data unit from the node using the altered forwarding information.

2. The method of claim 1, wherein altering the forwarding information comprises changing a next hop node for reaching a ~destination node.

3. The method of claim 2, comprising determining an initial next hop node for inclusion in the initial forwarding information prior to placing the data unit in the first transmission queue.

4. The method of claim 1, comprising moving the data unit to the head of a second transmission queue associated with a second network interface of the node based on the altered forwarding information.

5. The method of claim 1, wherein altering the forwarding information comprises obtaining a different radio profile for use in transmitting the data unit.

6. The method of claim 1, comprising:
upon the data unit reaching the head of the first transmission queue:
resolving a multicast address associated with the data unit to determine a plurality of multicast recipients,
identifying a network interface for forwarding the data unit to each of the plurality of recipients of the data unit, and
placing a copy of the data unit at a head of a queue associated with each identified network interface.

7. The method of claim 6, wherein altering the forwarding information comprises, for each copy of the data unit, updating a next hop address to reflect the corresponding next hop node for the respective multicast recipients.

8. The method of claim 6, wherein the node comprises a plurality of network interfaces, the method comprising, prior to the data unit reaching the head of the first transmission queue, placing the data unit in a second transmission queue associated with a second network interface.

9. The method of claim 8, comprising, prior to placing the data unit in the first transmission queue or the second transmission queue, resolving a multicast address associated with the data unit to determine a plurality of multicast recipients, and determining which network interfaces are to be used to forward the data unit to each multicast recipient.

10. The method of claim 1, wherein placing a data unit in a first transmission queue comprises storing a copy of the data unit in the first transmission queue.

11. The method of claim 1, wherein placing a data unit in a first transmission queue comprises storing the data unit in a memory and storing a placeholder in the first transmission queue.

12. The method of claim 1, wherein the network interface transmits the data unit over an ad hoc network.

13. A network device for transmitting data units from a node in a communications network, the network device comprising:
a first transmission queue for storing a data unit;
a network interface associated with the first transmission queue and configured to forward the data unit to other network devices; and
a forwarding module configured to: place the data unit in the first transmission queue of the network interface based at least in part on initial forwarding information that specifies information related to transmitting the data unit from the node to a second node in the communication network, wherein the second node is distinct from and physically separated from the node;
determine, at the network device, that the data unit has reached a head of the first transmission queue;
alter, at the network device, the initial forwarding information based at least in part on updated routing information, in response to determining that the data unit has reached the head of the first transmission queue; and
transmit the data unit from the network device using the altered forwarding information.

14. The network device of claim 13 wherein, when altering the forwarding information, the forwarding module is further configured to change a next hop node for reaching a destination node.

15. The network device of claim 14, wherein the forwarding module is further configured to determine an initial next hop node for inclusion in the initial forwarding information prior to placing the data unit in the first transmission queue.

16. The network device of claim 13, wherein the forwarding module is further configured to move the data unit to the head of a second transmission queue associated with a second network interface of the node based on the altered forwarding information.

17. The network device of claim 13 wherein, when altering the forwarding information, the forwarding module is further configured to obtain a different radio profile for use in transmitting the data unit.

18. The network device of claim 13, wherein the forwarding unit, upon determining that the data unit has reached the head of the first transmission queue, is further configured to:
resolve a multicast address associated with the data unit to determine a plurality of multicast recipients,
identify a network interface for forwarding the data unit to each of a plurality of multicast recipients of the data unit, and place a copy of the data unit at a head of a queue associated with each identified network interface.

19. The network device of claim 18, wherein, when altering the forwarding information, the forwarding module is configured to, for each copy of the data unit, update a next hop address to reflect the corresponding next hop node for the respective multicast recipients.

20. The network device of claim 18, wherein the forwarding module is configured to place the data unit in a second transmission queue associated with a second network interface, prior to the data unit reaching the head of the first transmission queue, and
wherein, prior to placing the data unit in the first transmission queue or the second transmission queue, the forwarding module is further configured to:
resolve a multicast address associated with the data unit to determine a plurality of multicast recipients, and
determine which network interfaces are to be used to forward the data unit to each multicast recipient.

21. The network device of claim 13, wherein the network interface is configured to transmit the data unit over an ad hoc network.

22. A non-transitory computer-readable medium containing instructions that, when executed by at least one processor of a node, causes the at least one processor to perform a method for transmitting data units from a node in a communications network, the method comprising:
placing a data unit in a first transmission queue associated with a network interface of the node based at least in part on initial forwarding information that specifies information related to transmitting the data unit from the node to a second node in the communication network, wherein the second node is distinct from and physically separated from the node;
determining, at the node, that the data unit has reached a head of the first transmission queue;

upon the data unit reaching the head of the first transmission queue, altering, at the node, the initial forwarding information based at least in part on updated routing information; and transmitting the data unit from the node using the altered forwarding information.

23. The non-transitory computer-readable medium of claim 22, wherein altering the forwarding information comprises changing a next hop node for reaching a destination node.

24. The non-transitory computer-readable medium of claim 23, wherein the method further comprises: determining an initial next hop node for inclusion in the initial forwarding information prior to placing the data unit in the first transmission queue.

25. The non-transitory computer-readable medium of claim 22, wherein the method further comprises: moving the data unit to the head of a second transmission queue associated with a second network interface of the node based on the altered forwarding information.

26. The non-transitory computer-readable medium of claim 22, wherein altering the forwarding information comprises obtaining a different radio profile for use in transmitting the data unit.

27. The non-transitory computer-readable medium of claim 22, wherein the method further comprises:
upon the data unit reaching the head of the first transmission queue: resolving a multicast address associated with the data unit to determine a plurality of multicast recipients,
identifying a network interface for forwarding the data unit to each of the plurality of recipients of the data unit, and
placing a copy of the data unit at a head of a queue associated with each identified network interface.

28. The non-transitory computer-readable medium of claim 27, wherein altering the forwarding information comprises, for each copy of the data unit, updating a next hop address to reflect the corresponding next hop node for the respective multicast recipients.

29. The non-transitory computer-readable medium of claim 27, wherein the node comprises a plurality of network interfaces, the method comprising:
prior to the data unit reaching the head of the first transmission queue, placing the data unit in a second transmission queue associated with a second network interface; and
prior to placing the data unit in the first transmission queue or the second transmission queue, resolving a multicast address associated with the data unit to determine a plurality of multicast recipients, and determining which network interfaces are to be used to forward the data unit to each multicast recipient.

30. The non-transitory computer-readable medium of claim 22, wherein the network interface transmits the data unit over an ad hoc network.

* * * * *

UNITED STATES PATENT AND TRADEMARK OFFICE
CERTIFICATE OF CORRECTION

PATENT NO. : 8,103,792 B2
APPLICATION NO. : 12/576170
DATED : January 24, 2012
INVENTOR(S) : Tasman et al.

It is certified that error appears in the above-identified patent and that said Letters Patent is hereby corrected as shown below:

Title Page, Item (75) change "Mitchell P. Tasman" to – "Mitchell Paul Tasman"

Signed and Sealed this
Seventeenth Day of April, 2012

David J. Kappos
*Director of the United States Patent and Trademark Office*